US009787240B2

United States Patent
Koseki et al.

(10) Patent No.: US 9,787,240 B2
(45) Date of Patent: Oct. 10, 2017

(54) CONTROLLER AND CONTROL METHOD FOR MOTOR

(71) Applicant: HITACHI AUTOMOTIVE SYSTEMS, LTD., Hitachinaka-shi, Ibaraki (JP)

(72) Inventors: Tomonobu Koseki, Isesaki (JP); Tomishige Yatsugi, Isesaki (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 0 days.

(21) Appl. No.: 15/124,985

(22) PCT Filed: Jan. 21, 2015

(86) PCT No.: PCT/JP2015/051553
§ 371 (c)(1),
(2) Date: Sep. 9, 2016

(87) PCT Pub. No.: WO2015/136989
PCT Pub. Date: Sep. 17, 2015

(65) Prior Publication Data
US 2017/0085205 A1    Mar. 23, 2017

(30) Foreign Application Priority Data
Mar. 12, 2014    (JP) ................. 2014-048515

(51) Int. Cl.
*H02P 27/04*    (2016.01)
*H02P 25/22*    (2006.01)
(Continued)

(52) U.S. Cl.
CPC .............. *H02P 25/22* (2013.01); *B62D 3/123* (2013.01); *B62D 5/0409* (2013.01);
(Continued)

(58) Field of Classification Search
CPC .... H02P 6/00; H02P 6/12; H02P 27/04; H02P 27/06; H02P 23/00; H02P 25/00
(Continued)

(56) References Cited

U.S. PATENT DOCUMENTS 8,878,474 B2 * 11/2014 Kezobo ............... H02P 29/0241
                                                       318/400.21
8,981,704 B2 *  3/2015 Endo ..................... B62D 5/046
                                                       318/400.01
(Continued)

FOREIGN PATENT DOCUMENTS

JP    2011-135692 A    7/2011
JP    2013-079027 A    5/2013
(Continued)

OTHER PUBLICATIONS

International Search Report and Written Opinion of the International Searching Authority mailed Mar. 31, 2015 in International Application No. PCT/JP2015/051553.

*Primary Examiner* — Antony M Paul
(74) *Attorney, Agent, or Firm* — Foley & Lardner LLP

(57) ABSTRACT

To provide a controller and a control method for a motor equipped with a plurality of energization systems each including a coil set of coils corresponding to a plurality of phases and an inverter for outputting a current to each of the phases in the coil set. The controller stops the inverter of a first energization system if the total phase current in the first energization system is an outlier. During a predetermined period after stopping the inverter of the first energization system, even if the total phase current in any other energization system is an outlier, the controller continues to operate the inverter of the other energization system. This makes it possible to continue to operate the inverter of a normal energization system as required as possible while (Continued)

stopping the inverter of an energization system having an abnormality such as a short-circuit or short-to-ground.

15 Claims, 11 Drawing Sheets

(51) Int. Cl.
  *B62D 5/04* (2006.01)
  *H02P 29/024* (2016.01)
  *B62D 3/12* (2006.01)
  *H02P 6/12* (2006.01)
(52) U.S. Cl.
  CPC ......... *B62D 5/0484* (2013.01); *B62D 5/0487* (2013.01); *H02P 6/12* (2013.01); *H02P 29/0241* (2016.02)
(58) Field of Classification Search
  USPC .... 318/400.01, 400.02, 400.14, 400.15, 700, 318/701, 727, 599, 800, 801, 430, 432, 318/437; 363/40, 44, 95, 120, 174, 175
  See application file for complete search history.

(56) References Cited

U.S. PATENT DOCUMENTS

| | | | |
|---|---|---|---|
| 9,124,207 B2* | 9/2015 | Hayashi | .................... H02P 6/20 |
| 9,397,592 B2* | 7/2016 | Kezobo | ................ B62D 5/0484 |
| 2011/0156626 A1 | 6/2011 | Mukai et al. | |
| 2013/0090809 A1 | 4/2013 | Kuroda | |
| 2013/0200827 A1 | 8/2013 | Kezobo et al. | |
| 2013/0207586 A1 | 8/2013 | Hayashi | |
| 2014/0246999 A1* | 9/2014 | Kezobo | ................ B62D 5/0484 |
| | | | 318/400.23 |

FOREIGN PATENT DOCUMENTS

| | | |
|---|---|---|
| JP | 2013-162680 A | 8/2013 |
| JP | 2013-165541 A | 8/2013 |

* cited by examiner

CONTROLLER AND CONTROL METHOD FOR MOTOR

TECHNICAL FIELD

The present invention relates to a controller for a motor equipped with plural energization systems each including a coil set of coils corresponding to plural phases and an inverter for outputting current to each phase in the coil set, and to a control method therefor.

BACKGROUND ART

Patent Document 1 discloses a controller equipped with inverters of plural systems that switchingly energize plural coil sets of a motor. In the controller, the total sum of phase currents is calculated at each system. If a difference in the total phase current between two systems deviates from a predetermined range, it is determined that the two systems are short-circuited. When the short-circuit is detected as above, either one of the two systems, which are compared to obtain the difference in the total phase current, is stopped.

REFERENCE DOCUMENT LIST

Patent Document

Patent Document 1: JP 2013-165541 A

SUMMARY OF THE INVENTION

Problems to be Solved by the Invention

In the configuration that the total sum of phase currents is calculated at each of the coil sets, and if a difference in the resultant total phase current between energization systems deviates from a predetermined range, an inverter of either energization system is stopped, there is a possibility of erroneously stopping an inverter of the other energization system even though the system is operating normally. This is because the difference in the total phase current deviates from the predetermined range not only in case a short-circuit occurs between the energization systems but also in case one of the energization systems has any abnormality, whereas the other system operates normally.

The present invention has been accomplished in view of some of the above problems and accordingly it is an object of the present invention to provide a controller and a control method for a Motor, which can stop an inverter in a failed energization system while continuing to operate an inverter in a normal energization system as required as possible.

Means For Solving The Problems

In order to achieve the object, the present invention provides a controller for a motor equipped with a plurality of energization systems each including a coil set of coils corresponding to a plurality of phases and an inverter for outputting a current to each of the phases in the coil set, the controller comprising: a first control unit that detects an abnormality in each of the energization systems and stops the inverter of the energization system having an abnormality detected; and a second control unit that determines whether a predetermined period has elapsed after the first control unit stops the inverter of one of the energization systems, and continues to operate the inverter of the other energization system having an abnormality detected within the predetermined period.

Furthermore, the present invention provides a control method for a motor equipped with a plurality of energization systems each including a coil set of coils corresponding to a plurality of phases and an inverter for outputting a current to each of the phases in the coil set, the method comprising the steps of: determining whether an abnormality occurs in each of the energization systems; stopping the inverter of the energization system having an abnormality detected; and continuing to operate the inverter of the other energization system having an abnormality detected within a predetermined period from when the inverter is stopped.

Effects of the Invention

According to the present invention, it is possible to stop an inverter of a failed energization system as appropriate while continuing motor control as required as possible.

MODE FOR CARRYING OUT THE INVENTION

Figure 1:
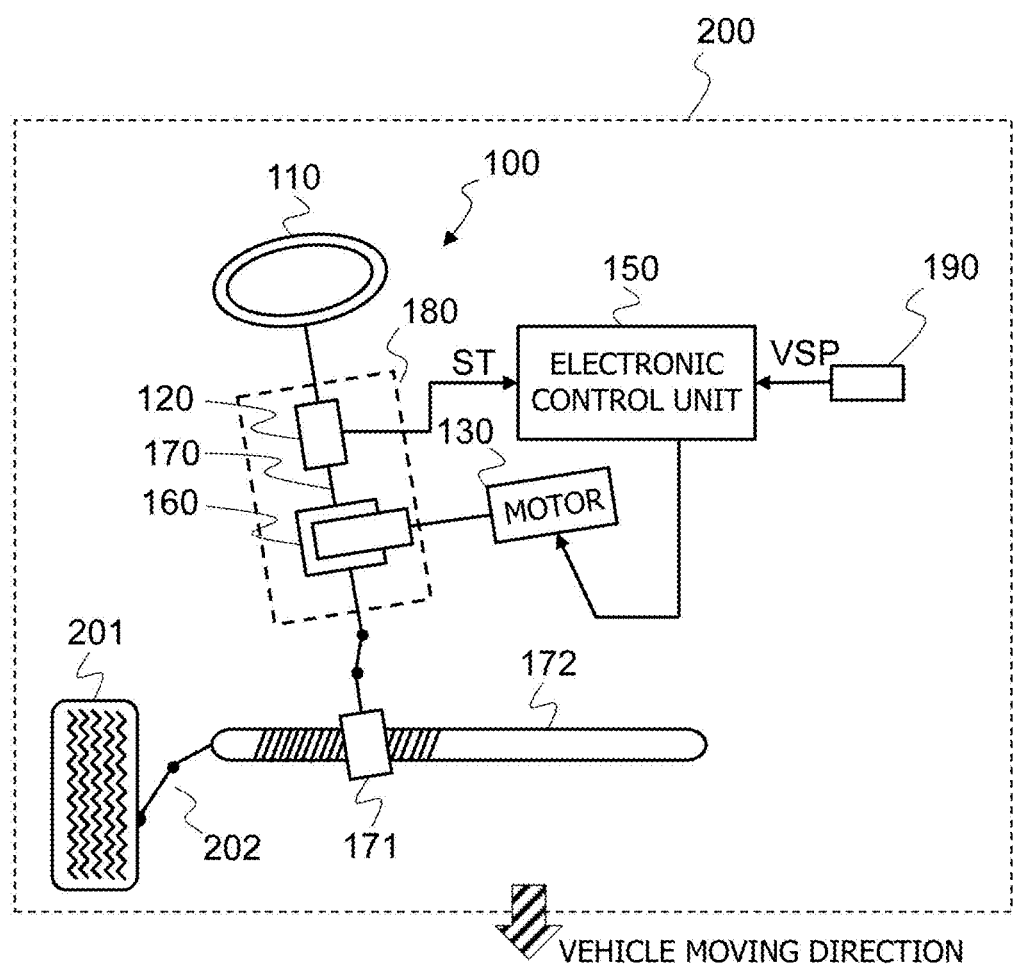
FIG. 1 is a schematic diagram of an electric power steering device that adopts a controller for a motor according to an embodiment of the present invention.

Hereinafter, an embodiment of the present invention will be described. FIG. 1 illustrates an example of a vehicle electric power steering device to which a controller and a control method for a motor according to the present invention are applied. An electric power steering device 100 of FIG. 1, which is installed in a vehicle 200, generates a steering assist force with an electric motor 130.

Electric power steering device 100 is composed of a steering wheel 110, a steering torque sensor 120, electric motor 130, an electronic control unit (ECU) 150, a reducer 160 that reduces a rotational speed of electric motor 130 and then transmits the reduced rotational speed to a steering shaft (pinion shaft) 170, and the like. Steering torque sensor 120 and reducer 160 are disposed in a steering column 180 that accommodates steering shaft 170.

A pinion gear 171 is provided at the tip end of steering shaft 170. Along with the rotation of pinion gear 171, a rack gear 172 is horizontally moved to the left or right as viewed in the travel direction of vehicle 200. A steering mechanism 202 for a wheel 201 is provided at the opposite ends of rack gear 172. Along with the horizontal movement of rack gear 172, wheel 201 can change its direction.

Steering torque sensor 120 detects a steering torque of steering shaft 170 generated as a driver steers the vehicle, and then outputs a signal ST indicating the detected steering torque to electronic control unit 150. Electronic control unit 150 includes a microcomputer 302, inverters 1A and 1B for driving electric motor 130, drive circuits 303A and 303B for inverters 1A and 1B, etc. and receives information about a state variable for determining a steering assist force such as steering torque signal ST and a vehicle speed signal VSP output from a vehicle speed sensor 190.

When receiving steering torque signal ST, vehicle speed signal VSP, or the like, electronic control unit 150 executes PWM (pulse width modulation) control on energization to electric motor 130 based on the driving condition of a vehicle as indicated by these signals, thereby controlling the torque generated in electric motor 130, i.e., steering assist force. In this way, electronic control unit 150 serves as a drive controller for electric motor 130.

Regarding the inverter and the inverter drive circuit incorporated in electronic control unit 150, the inverter can be provided alone or together with the inverter drive circuit independently outside electronic control unit 150. In this case, electronic control unit 150 constitutes, together with the external inverter or both the external inverter and inverter drive circuit, the drive controller for electric motor 130.

Figure 2:
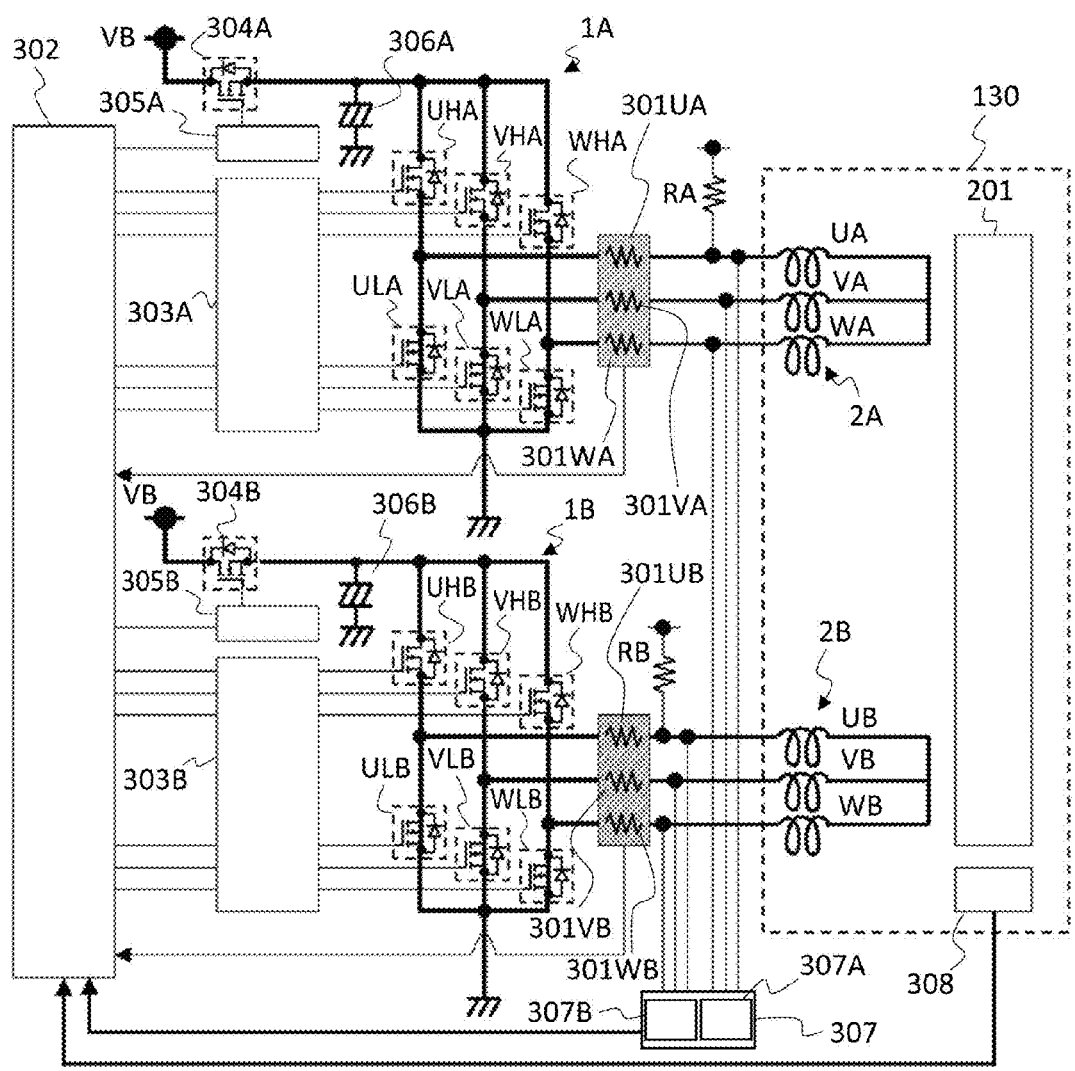
FIG. 2 is a circuit diagram of the controller according to the embodiment of the present invention.

FIG. 2 illustrates an example of the circuit configuration of electronic control unit 150 and electric motor 130. Electric motor 130 of FIG. 2 is a three-phase synchronous electric motor composed of a first coil set 2A of star-connected three-phase coils UA, VA, and WA and a second coil set 2B of star-connected three-phase coils UB, VB, and WB. In first coil set 2A and second coil set 2B, a connection point among three-phase coils U, V, and W is a neutral point.

First coil set 2A and second coil set 2B are disposed in an unillustrated cylindrical stator and a permanent magnet rotator 201 is rotatably provided inside a space formed at the central portion of the stator. First coil set 2A and second coil set 2B share a magnetic circuit. Moreover, first coil set 2A is directly connected to a first inverter 1A, and second coil set 2B is directly connected to a second inverter 1B. First inverter 1A supplies power to first coil set 2A, and second inverter 1B supplies power to second coil set 2B.

First inverter 1A is configured by a three-phase bridge circuit including three pairs of semiconductor switches, i.e., semiconductor switches UHA and ULA for driving a U-phase coil UA of first coil set 2A, semiconductor switches VHA and VLA for driving a V-phase coil VA thereof, and semiconductor switches WHA and WLA for driving a W-phase coil WA thereof. Moreover, second inverter 1B is configured by a three-phase bridge circuit including three pairs of semiconductor switches, i.e., semiconductor switches UHB and ULB for driving a U-phase coil UB of second coil set 2B, semiconductor switches VHB and VLB for driving a V-phase coil VB thereof, and semiconductor switches WHB and WLB for driving a W-phase coil WB thereof.

In this embodiment, the semiconductor switches constituting first inverter 1A and second inverter 1B are N-channel MOSFETs (metal oxide semiconductor field effect transistors). In first inverter 1A and second inverter 1B, semiconductor switches UH and UL have series-connected drain and source between a power supply VB and the ground point, and a connection point between semiconductor switches UH and UL is connected to U-phase coil U.

Furthermore, in first inverter 1A and second inverter 1B, semiconductor switches VH and VL have series-connected drain and source between power supply VB and the ground point, and a connection point between semiconductor switches VH and VL is connected to V-phase coil V.

Moreover, in first inverter 1A and second inverter 1B, semiconductor switches WH and WL have series-connected drain and source between power supply VB and the ground point, and a connection point between semiconductor switches WH and WL is connected to W-phase coil W.

First drive circuit 303A functions to drive the semiconductor switches constituting first inverter 1A, and includes three high-potential side drivers for respectively driving semiconductor switches VHA, UHA, and WHA as high-potential side switching elements in first inverter 1A and three low-potential side drivers for respectively driving semiconductor switches VLA, ULA, and WLA as low-potential side switching elements in first inverter 1A.

Second drive circuit 303B functions to drive the semiconductor switches constituting second inverter 1 B, and includes three high-potential side drivers for respectively driving semiconductor switches VHB, UHB, and WHB as high-potential side switching elements in second inverter 1 B, and three low-potential side drivers for respectively driving semiconductor switches VLB, ULB, and WLB as low-potential side switching elements in second inverter 1 B. Note that the high-potential side switching element can be referred to as "upstream drive element" or "upper arm". The low-potential side switching element can be referred to as "downstream drive element" or "lower arm". In addition, a connection point between any high-potential side switching element and any low-potential side switching element serves as an output point of the inverter.

First drive circuit 303A and second drive circuit 303B drive the semiconductor switches constituting inverters 1A and 1B, respectively according to a command signal from microcomputer 302. As described above, the motor controller of this embodiment incorporates two energization systems: a first energization system including first coil set 2A and first inverter 1A and a second energization system including second coil set 2B and second inverter 1B. Note that the first energization system and the second energization system can be referred to as a "first channel ch1" and a "second channel ch2", respectively.

A power supply relay 304A is provided between power supply VB and first inverter 1A in order to interrupt the power supply to first inverter 1A, and a power supply relay 304B is provided between power supply VB and second inverter 1B in order to interrupt the power supply to second inverter 1B. In this embodiment, power supply relays 304A and 304B are configured by semiconductor switches. The semiconductor switches constituting power supply relays 304A and 304B are driven by drive circuits 305A and 305B. As power supply relays 304A and 304B, electromagnetic relays, each of which provides electrical switching by physically moving its contact point, may be alternatively used.

Drive circuits 305A and 305B for power supply relays 304A and 304B drive the semiconductor switches constituting power supply relays 304A and 304B according to a command signal from microcomputer 302. To be specific, microcomputer 302 can interrupt power supply to first inverter 1A and that to second inverter 1B independently of each other. Furthermore, in order to reduce fluctuations in power supply voltage to inverters 1A and 1B, capacitors 306A and 306B are provided. More specifically, capacitor 306A connects, to the ground point, the power supply line between power supply relay 304A and inverter 1A, whereas capacitor 306B connects, to the ground point, the power supply line between power supply relay 304B and inverter 1B.

Also, there are provided voltage monitor circuits 307A and 307B for detecting coil-end voltages at coil sets 2A and 2B, respectively. Voltage monitor circuits 307A and 307B output, to microcomputer 302, signals indicating detected coil-end voltages at coil sets 2A and 2B. In addition, to keep the coil-end potential in coil set 2A fixed even when all the switching elements in inverter 1A are turned OFF, a pull-up resistor RA for pulling up U-phase coil UA in coil set 2A is provided. To keep the coil-end potentials in coil set 2B fixed even when all the switching elements in inverter 1B are turned OFF, a pull-up resistor RB for pulling up U-phase coil UB in coil set 2B is provided. An angle sensor 308 detects the angle of rotor 201, and outputs a signal indicating the detected angle to microcomputer 302.

Moreover, current sensors 301UA, 301VA, 301WA, 301UB, 301VB, and 301WB are provided to detect current flowing in a corresponding one of three-phase coils U, V, and W, and disposed on the drive line connecting a corresponding pair of three-phase coils U, V, and W and connection points between low-potential side semiconductor switches UL, VL, and WL and high-potential side semiconductor switches UH, VH, and WH, more specifically, disposed between a corresponding pair of three-phase coils U, V, and W and output points of inverters 1A and 1B. Note that current sensors 301UA, 301VA, 301WA, 301UB, 301VB, and 301WB can be also referred to as "current detecting resistors", "current detecting devices", or "current detecting means".

Figure 3:
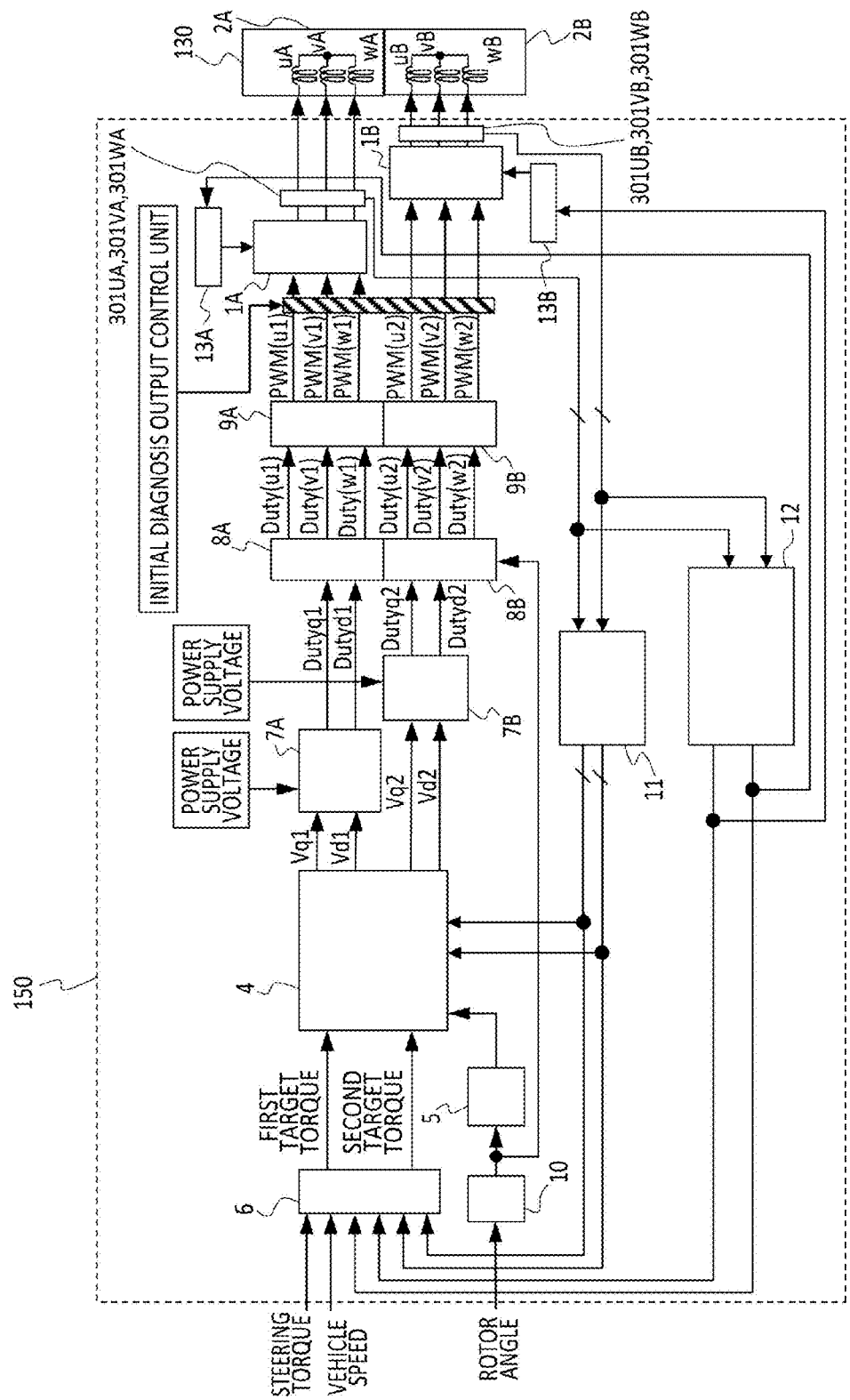
FIG. 3 is a functional diagram of the controller according to the embodiment of the present invention.

FIG. 3 is a functional block diagram illustrating an example of the function of controlling inverters 1A and 1B, which is implemented by microcomputer 302. A target assist torque calculating unit 6 calculates a target assist torque, i.e., a target value of an output torque of electric motor 130 based on steering conditions such as a steering torque and a vehicle speed. In this example, target assist torque calculating unit 6 individually sets a target assist torque for the first energization system and that for the second energization system, aiming at generating a steering assist force corresponding to the total sum of a motor torque generated through energization control over the first energization system and that generated through energization control over the second energization system.

An angle calculating unit 10 receives a signal from angle sensor 308 and then calculates the angle of rotor 201 of electric motor 130. A motor rotational speed calculating unit 5 calculates the rotational speed (rpm) of electric motor 130 based on information about the calculated angle of rotor 201 from angle calculating unit 10 and then outputs a signal indicating the calculated motor rotational speed to an output voltage calculating unit 4.

Output voltage calculating unit 4 receives data about a target assist torque in each energization system, data about the rotational speed of electric motor 130, and a d-axis actual current value $I_d$ and a q-axis actual current value $I_q$ at each energization system, both of which are calculated by a three-to-two phase converting unit 11. Output voltage calculating unit 4 calculates a d-axis voltage command value $V_d1$ and a q-axis voltage command value $V_q1$ of first inverter 1A and a d-axis voltage command value $V_d2$ and a q-axis voltage command value $V_q2$ of a second inverter 1B, and then outputs the calculated values.

Three-to-two phase converting unit 11 calculates a d-axis actual current value $I_d1$ and a q-axis actual current value $I_q1$ of the first energization system based on output signals from current sensors 301UA, 301VA, and 301WA, i.e., detection values of actual currents flowing through the respective phases in first coil set 2A. In addition, three-to-two phase converting unit 11 calculates a d-axis actual current value $I_d2$ and a q-axis actual current value $I_q2$ of the second energization system based on output signals from current sensors 301UB, 301VB, and 301WB, i.e., detection values of actual currents flowing through the respective phases in second coil set 2B. Three-to-two phase converting unit 11 outputs data about d-axis actual current value $I_d1$ and q-axis actual current value $I_q1$ of the first energization system and data about d-axis actual current value $I_d2$ and q-axis actual current value $I_q2$ of the second energization system to output voltage calculating unit 4 and target assist torque calculating unit 6, respectively.

Then, d-axis voltage command value $V_d1$ and q-axis voltage command value $V_q1$ output from output voltage calculating unit 4 are input to a first output duty calculating unit 7A. First output duty calculating unit 7A calculates a d-axis duty Dutyd1 and a q-axis duty Dutyq1 of PWM control on first inverter 1A, based on d-axis voltage command value $V_d1$, q-axis voltage command value $V_q1$, and the power supply voltage of first inverter 1A.

Furthermore, d-axis voltage command value $V_d2$ and q-axis voltage command value $V_q2$ output form output voltage calculating unit 4 are input to a second output duty calculating unit 7B. Second output duty calculating unit 7B calculates a d-axis duty Dutyd2 and a q-axis duty Dutyq2 of PWM control on second inverter 1B based on d-axis voltage command value $V_d2$, q-axis voltage command value $V_q2$, and the power supply voltage of second inverter 1B.

A first two-to-three phase converting unit 8A receives d-axis duty Dutyd1 and q-axis duty Dutyq1 output from first output duty calculating unit 7A and also information about the rotor angle in electric motor 130. First two-to-three phase converting unit 8A calculates, based on these, duty command values DutyU1, DutyV1, and DutyW1 of three phases in first coil set 2A, and then outputs the calculated values. In addition, a second two-to-three phase converting unit 8B receives d-axis duty Dutyd2 and q-axis duty Dutyq2 output from second output duty calculating unit 7B and also information about the rotor angle in electric motor 130. Second two-to-three phase converting unit 8B calculates, based on these, duty command values DutyU2, DutyV2, and DutyW2 of three phases in second coil set 2B, and then outputs the calculated values.

A first dead time compensation unit 9A receives duty command values DutyU1, DutyV1, and DutyW1 output from first two-to-three phase converting unit 8A. First dead time compensation unit 9A compensates for the dead time thereof to obtain, by calculation, duty command values DutyU1, DutyV1, and DutyW1 and then outputs the calculated values to inverter 1A.

In addition, a second dead time compensation unit 9B receives duty command values DutyU2, DutyV2, and DutyW2 output from second two-to-three phase converting unit 8B. Second dead time compensation unit 9B compensates for the dead time thereof to obtain, by calculation, duty command values DutyU2, DutyV2, and DutyW2, and outputs the calculated values to inverter 1B.

The dead time compensation means the processing for holding down a voltage drop etc. that will occur with a dead time voltage at the time of PWM control for retarding, by the dead time, the rising edge of a PWM signal as obtained by comparing a triangular wave with a command value to thereby generate a gate signal of the switching element so as not to cause a short-circuit between upper and lower arms of inverters 1A and 1B.

An inverter output ON/OFF determination unit 12 receives output signals from current sensors 301UA, 301VA, and 301WA of the first energization system and output signals from current sensors 301UB, 301VB, and 301WB of the second energization system, and controls outputting an OFF command signal for the first energization system and an OFF command signal for the second energization system according to current detection values. The OFF command signal for the first energization system output from inverter output ON/OFF determination unit 12 is input to a first energization system ON/OFF control unit 13A. After receiving the OFF command signal, first energization system ON/OFF control unit 13A turns OFF all the switching elements in first inverter 1A, hereby stopping first inverter 1A. Note that stopping the inverter is to suspend current output from the inverter to the coil.

Likewise, the OFF command signal for the second energization system output from inverter output ON/OFF determination unit 12 is input to a second energization system ON/OFF control unit 13B. After receiving the OFF command signal, second energization system ON/OFF control unit 13B turns OFF all switching elements in second inverter 1B, hereby stopping second inverter 1B.

Furthermore, the OFF command signal for the first energization system and that for the second energization system, which are output from inverter output ON/OFF determination unit 12 are input to target assist torque calculating unit 6. Then, target assist torque calculating unit 6 calculates a target assist torque for each energization system according to whether inverter output ON/OFF determination unit 12 outputs a command to stop first inverter 1A or second inverter 1B.

Figure 4:
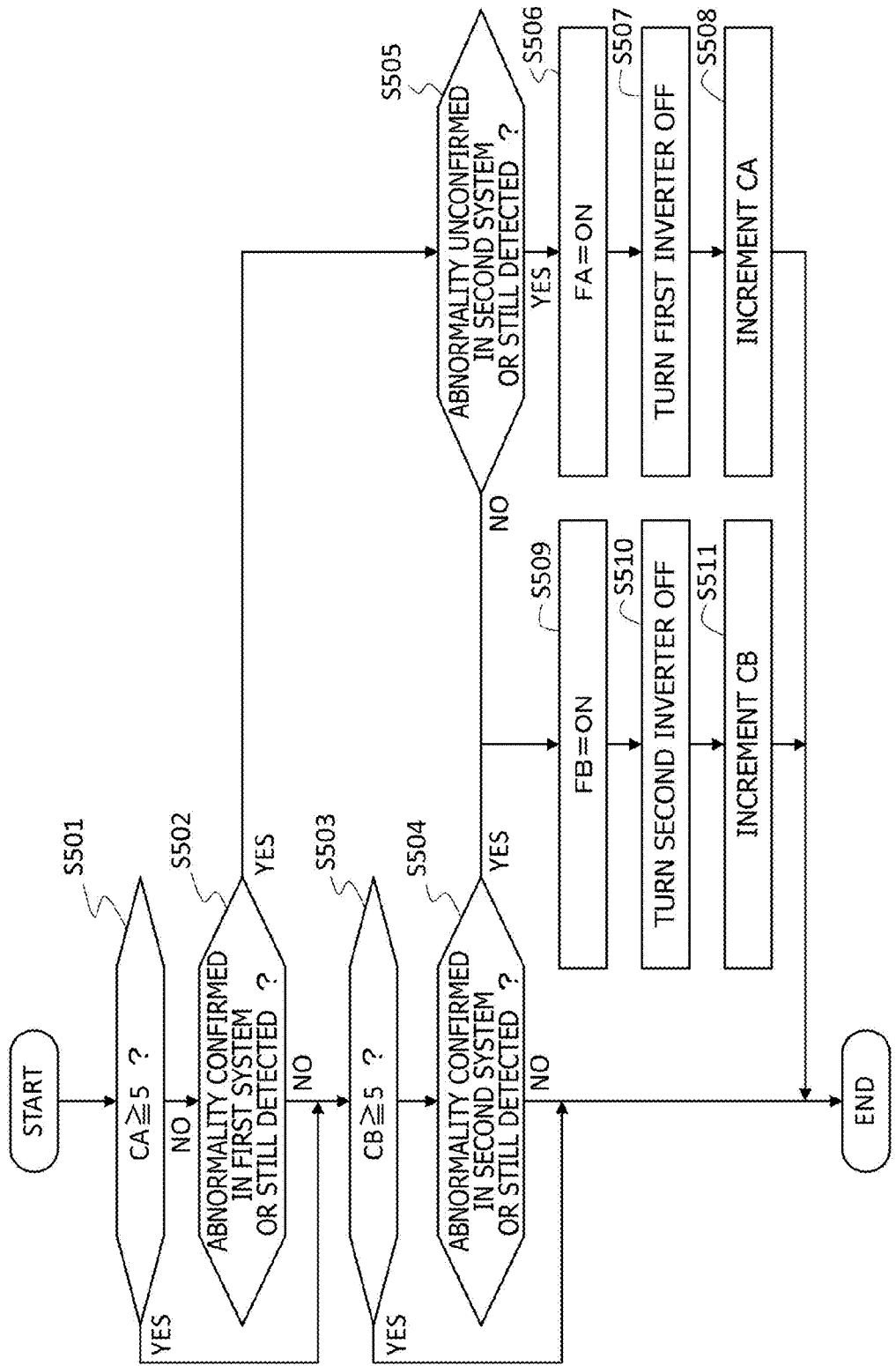
FIG. 4 is a flowchart illustrating the abnormality diagnosis procedure according to the embodiment of the present invention.

Referring to the flowchart of FIG. 4, how inverter output ON/OFF determination unit 12 controls stopping inverter 1A or 1B is described next. The routine in the flowchart of FIG. 4 is executed by microcomputer 302 interruptedly at a predetermined time interval. The predetermined time interval at which microcomputer 302 executes the routine may be, for example, about 1 ms.

First, in step S501, microcomputer 302 determines whether an abnormality detection counter CA reaches a predetermined value C1 or more. Note that zero is, for example, initially set to this abnormality detection counter CA for the first energization system and to an abnormality detection counter CB for the second energization system as described below. Moreover, in microcomputer 302, predetermined value C1 is set to, for example, 5.

When detecting that abnormality detection counter CA for the first energization system has a value less than predetermined value C1, microcomputer 302 proceeds to step S502, hereby determining whether an abnormality confirmation flag FA for the first energization system is ON or whether an absolute value of the total sum of phase currents flowing in the coils of first coil set 2A in the first energization system remains higher than a predetermined current SLC for a predetermined time T1 or more.

The condition that an absolute value of the total phase current exceeds predetermined current SLC implies that the total phase current deviates from a predetermined range including zero. Note that in microcomputer 302, predetermined current SLC and predetermined time T1 are set as a reference for determining whether the energization system is normal or abnormal. Predetermined current SLC satisfies the condition of SLC>0 A and is set to, for example, 10 A. Predetermined time T1 is set to, for example, 5 ms.

When the energization system is operating normally, the total phase current approximates zero. Provided that an absolute value of the total phase current is around zero, microcomputer 302 determines that the phase currents in the energization system concerned are normal. On the other hand, if the total phase current deviates from zero by a predetermined value or more for predetermined time T1 or more, microcomputer 302 determines that the phase currents in the energization system concerned are abnormal. Note that the condition that an absolute value of the total phase current approximates zero implies that the absolute value of the total phase current is within a predetermined range including zero. The predetermined range can be considered almost zero, taking into account any detection error.

In this example, if abnormality confirmation flag FA for the first energization system is OFF, indicating that an abnormality in the first energization system is not confirmed and also, if an absolute value of the total phase current in first coil set 2A does not remain higher than predetermined current SLC over predetermined time T1 or more, that is, if phase currents in the first energization system are normal, microcomputer 302 proceeds to step S503. In step S503, microcomputer 302 determines whether abnormality detection counter CB for the second energization system reaches predetermined value C1 or more. Note that in microcomputer 302, predetermined value C1 is set to, for example, 5.

Abnormality detection counter CB for the second energization system has a value less than predetermined value C1, microcomputer 302 proceeds to step S504, hereby determining whether abnormality confirmation flag FB for the second energization system is ON or whether an absolute value of the total sum of detection values of phase currents flowing in the coils of second coil set 2B at the second energization system remains higher than predetermined current SLC over predetermined time T1 or more.

In this example, if abnormality confirmation flag FB for the second energization system is OFF, indicating that an abnormality in the second energization system is not confirmed and also if an absolute value of the total phase current in second coil set 2B does not remain higher than predetermined current SLC over predetermined time T1 or more, that is, if phase currents in the second energization system are normal and also those in the first energization system are normal, microcomputer 302 ends this routine at this point and continues to operate the inverters of the first energization system and the second energization system as in the normal time.

On the other hand, if an absolute value of the total phase current in first coil set 2A exceeds predetermined current SLC and such abnormality in the total phase current is observed over predetermined time T1 or more, microcomputer 302 proceeds to step S505 from step S502.

In step S505, microcomputer 302 determines whether abnormality confirmation flag FB for the second energization system is OFF or whether abnormality detection counter CB for the second energization system reaches predetermined value C1 or more.

Then, if abnormality confirmation flag FB for the second energization system is OFF and if abnormality detection counter CB for the second energization system reaches predetermined value C1 or more, microcomputer 302 proceeds to step S506 to set ON abnormality confirmation flag FA for the first energization system, indicating that an abnormality in the first energization system is confirmed. In this example, if microcomputer 302 detects an abnormality in the total phase current at the first energization system ahead, the condition that abnormality confirmation flag FB for the second energization system is OFF is established in step S505 and then, the microcomputer proceeds to step S506.

Note that abnormality confirmation flags FA and FB are initially set OFF. After switched to ON, the flags are kept ON unless being reset at workshop, etc. In step S506, abnormality confirmation flag FA for the first energization system is switched to ON, microcomputer 302 proceeds to step S507 to output an OFF command to inverter 1A in the first energization system. As a result, all the switching elements constituting first inverter 1A in the first energization system are turned OFF to stop first inverter 1A.

At this time, microcomputer 302 keeps power supply relay 304A ON. If charges in capacitor 306A are emitted or power supply voltage VB increases after power supply relay 304A is turned OFF, even when first inverter 1A is turned OFF, current might flow to first inverter 1A from second inverter 1B being under the switching operation, due to a parasitic diode of a MOSFET of first inverter 1A, with the result that the total phase current in the second energization system might deviate from zero. In view of the above, microcomputer 302 keeps power supply relay 304A ON. Microcomputer 302 can, however, turn OFF power supply relay 304A if there are no fears that capacitor 306A discharges and power supply voltage VB increases after turning OFF power supply relay 304A.

After issuing an OFF command for the first energization system in step S507, microcomputer 302 proceeds to step S508 to increment abnormality detection counter CA for the first energization system by predetermined value AC from a previous value. Note that in microcomputer 302, predetermined value AC is set to, for example, 1.

As described above, microcomputer 302 increments abnormality detection counter CA for the first energization system and then proceeds to step S501 at the next timing of interruptedly executing the routine. In step S501, if determining that abnormality detection counter CA for the first energization system is less than predetermined value C1, the microcomputer proceeds to step S502 to determine that abnormality confirmation flag FA for the first energization system is ON, hereby proceeding to step S505.

Then, in step S505, if determining that abnormality confirmation flag FB for the second energization system is OFF, the microcomputer proceeds to steps S506 to S508 to reincrement abnormality detection counter CA for the first energization system. To be specific, during the delay time after abnormality confirmation flag FA for the first energization system is switched to ON to thereby stop inverter 1A until abnormality detection counter CA for the first energization system is incremented up to predetermined value C1, microcomputer 302 does not proceed to step S503 and subsequent steps, and neither confirmed is an abnormality in the second energization system as described later.

Abnormality detection counter CA is incremented each time the microcomputer interruptedly executes this routine. This routine is executed interruptedly at regular time intervals. Thus, a requisite period until abnormality detection counter CA for the first energization system is incremented up to predetermined value C1 is defined according to predetermined value C1 and the time interval at which the routine is interruptedly executed.

If abnormality detection counter CA for the first energization system is incremented up to predetermined value C1 after abnormality confirmation flag FA for the first energization system is switched to ON, microcomputer 302 determines, in step S501, that abnormality detection counter CA for the first energization system reaches predetermined value C1 or more and thus proceeds to step S503, skipping step S502.

That is, during a period until abnormality detection counter CA for the first energization system is incremented up to predetermined value C1, even if an absolute value of the total phase current in the second energization system remains higher than predetermined current SLC over predetermined time T1 or more, such abnormality in the second energization system is not confirmed in response to the detection thereof and inverter 1B in the second energization system is kept operating, not stopped.

In other words, during a period from when an abnormality is confirmed in the first energization system until abnormality detection counter CA is incremented up to predetermined value C1, the detection of an abnormality in any phase current at the second energization system is considered invalid. Similar to the case no abnormality is found, inverter 1B in the second energization system continues to drive the motor under the control.

If microcomputer 302 proceeds to step S503 after a predetermined time from when confirming an abnormality in the first energization system, abnormality detection counter CB for the second energization system is not incremented. Thus, microcomputer 302 determines that abnormality detection counter CB for the second energization system is less than predetermined value C1 and then proceeds to step S504.

In this example, if any phase current in the second energization system is abnormal, and an absolute value of the total phase current in second coil set 2B remains higher than predetermined current SLC over predetermined time T1 or more, microcomputer 302 proceeds from step S504 to step S509.

In step S509, microcomputer 302 sets ON abnormality confirmation flag FB for the second energization system and in subsequent step S510, issues an OFF command for the second energization system, hereby turning OFF all the switching elements constituting second inverter 1B for the second energization system to stop second inverter 1B. In addition, microcomputer 302 proceeds to step S511 to increment abnormality detection counter CB for the second energization system by predetermined value ΔC1 from the previous value.

Meanwhile, if no abnormality is found in phase currents at the second energization system when abnormality detection counter CA reaches predetermined value C1 after the confirmation of an abnormality in the first energization system, microcomputer 302 skips steps S509 to S511 and ends this routine. In this case, inverter 1A of the first energization system is stopped due to an abnormal phase current in first coil set 2A. Meanwhile since phase currents in second coil set 2B are normal, second inverter 1B of the second energization system continues to drive the motor.

As described above, even when any phase current in the second energization system is abnormal, during a predetermined period from when an abnormality in the first energization system is confirmed until abnormality detection counter CA reaches predetermined value C1, microcomputer 302 does not proceed to step S509 and subsequent steps. As a result, second inverter 1B of the second energization system keeps operating. Even at the time when abnormality detection counter CA reaches predetermined value C1, if any phase current in the second energization system is still abnormal, second inverter 1B of the second energization system is stopped.

The processing flow is described above, focusing on the case an abnormality is found in any phase current in the first energization system as an example. In case an abnormality is found in any phase current at the second energization system as well, microcomputer 302 executes similar processing.

More specifically, if an abnormality is found in any phase current at the second energization system while no abnormality is found in phase currents at the first energization system, with the result that the total phase current in second coil set 2B deviates from zero by a predetermined value or more over a predetermined time or more, microcomputer 302 proceeds from step S504 to steps S509 to S511, hereby setting ON abnormality confirmation flag FB for the second energization system to start incrementing abnormality detection counter CB.

Even if microcomputer 302 detects an abnormality in any phase current at the first energization system after setting ON abnormality confirmation flag FB for the second energization system, the microcomputer continues to operate inverter 1A of the first energization system without confirming the abnormality in the first energization system, until detecting in step S505 that abnormality detection counter CB reaches predetermined value C1 or more, in other words, after the lapse of a predetermined time from when inverter 1B in the second energization system is stopped.

When the predetermined period has elapsed from when inverter 1B in the second energization system is stopped, if an abnormality is found in phase currents at the first energization system, microcomputer 302 proceeds from step S505 to step S506 to confirm the abnormality in the first energization system following the confirmation of the abnormality in the second energization system.

Here, if an abnormality is found in any phase current at both of the first energization system and the second energization system substantially at the same time, according to the processing illustrated in the flowchart of FIG. 4, microcomputer 302 determines that any phase current in the first energization system is abnormal ahead of the determination as to the abnormality in any phase current at the second energization system. Thus, the abnormality in the first energization system is first confirmed. After a predetermined period has elapsed from then, the abnormality is confirmed in the second energization system.

That is, according to the processing illustrated in the flowchart of FIG. 4, the abnormality determination for the first energization system is prioritized. However, the abnormality determination for the second energization system can be prioritized instead. Note that if each energization system has no abnormality, target assist torque calculating unit 6 assigns, for example, a half of the requisite total target assist torque evenly to each of the first energization system and the second energization system. The requisite total target assist torque is defined depending on steering conditions such as a steering torque and a vehicle speed.

Meanwhile, if an abnormality is confirmed in either one of inverters 1A and 1B, by which the failed one is stopped and the other keeps operating, target assist torque calculating unit 6 sets to zero the target assist torque for the energization system having the abnormality confirmed, while assigning the total target assist torque to the other energization system so as to get the inverter of the other system to generate the requisite total target assist torque that is defined depending on steering conditions such as a steering torque and a vehicle speed.

Besides, the target assist torque for the other normal energization system can be arbitrarily set lower than the total target assist torque but higher than half of the total target assist torque.

Figure 5:
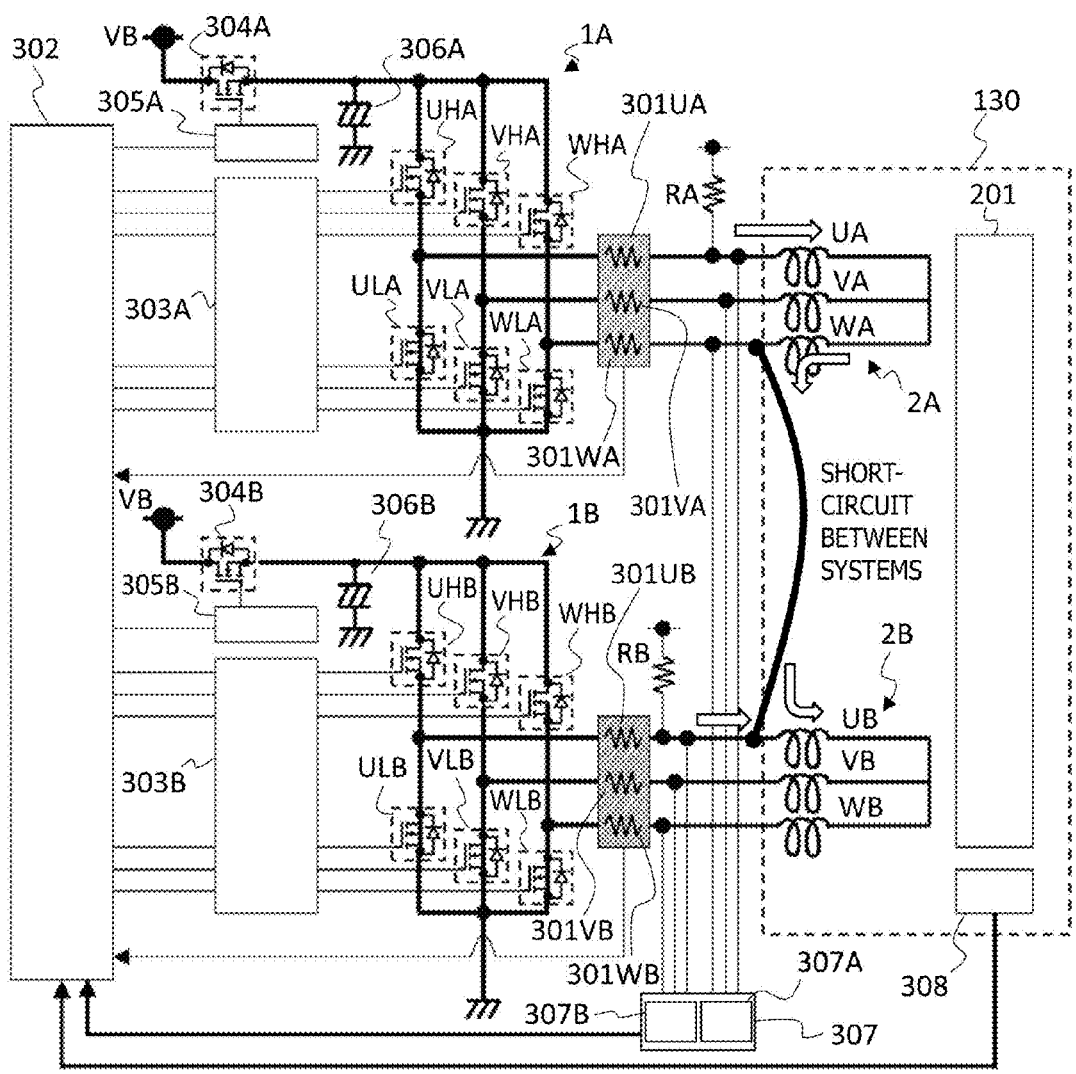
FIG. 5 is a circuit diagram illustrating a first energization system and a second energization system, which are short-circuited, according to the embodiment of the present invention.

Next, a detailed description is given of advantageous functions and effects from the processing executed by microcomputer 302 as illustrated in the flowchart of FIG. 4, taking a fault mode as an example. FIG. 5 illustrates a short-circuit between the energization systems as an example of the fault mode. More specifically, in the illustrated example, a short-circuit occurs between a W-phase drive line of first coil set 2A and a U-phase drive line of second coil set 2B.

When a short-circuit occurs between the energization systems as above, for example, if the inverters of both the energization systems are controlled to enable current flow from the U-phase to the V-phase, a current flowing into the U-phase leaks to a short-circuited path through the W-phase in the first energization system. The current flowing into the short-circuited path is not detected by current sensors 301UA, 301VA, and 301WA.

Figure 6:
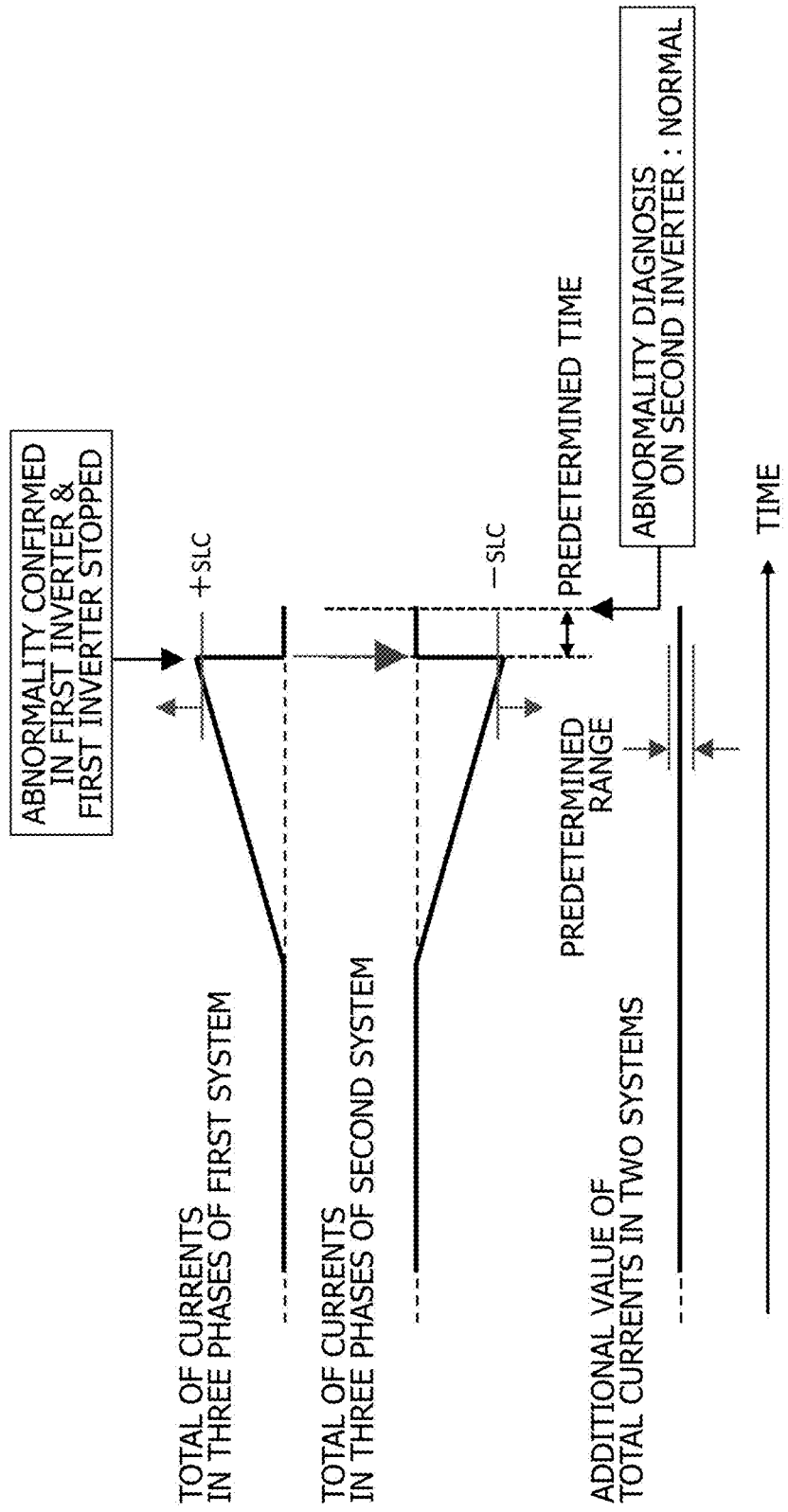
FIG. 6 is a timing chart illustrating current detection values obtained when the first energization system and the second energization system are short-circuited according to the embodiment of the present invention.

Provided that the direction in which the current flows into the motor, that is, the direction leading to the neutral point is called a "positive" direction, whereas the direction in which the current flows out of the motor, that is, the direction away from the neutral point is called a "negative" direction, the total sum of currents detected by current sensors 301UA, 301VA, and 301WA deviates to the positive side from zero, or a normal value (no abnormality) as illustrated in FIG. 6 because the current leaking to the short-circuited path, i.e., the current flowing in the negative direction is not detected.

On the other hand, in the second energization system, the leak current from the first energization system flows into the U-phase. Such current flowing in the positive direction is not detected by current sensors 301UA, 301VA, and 301WA. Regarding the current flowing in the negative direction, the leak current from the first energization system is included in the detection result. Thus, as illustrated in FIG. 6, the total sum of phase currents in the second energization system deviates to the negative side from zero, or a normal value (no abnormality).

In such fault mode, if microcomputer 302 executes the processing illustrated in the flowchart of FIG. 4, the microcomputer first detects an abnormality in the total phase current at the first energization system, hereby turning OFF all the switching elements constituting first inverter 1A of the first energization system.

In case a short-circuit occurs between the first and second energization systems, if the total phase current in the first energization system is abnormal, the total phase current in the second energization system is abnormal as well. As mentioned above, however, during a predetermined period from when an abnormality in the first energization system is confirmed to thereby stop first inverter 1A, second inverter 1B is not stopped in response to the detection of an abnormality in the second energization system.

Then, when confirmed that the total phase current in the first energization system is abnormal, hereby turning OFF all the switching elements constituting first inverter 1A of the first energization system, no current flows from the first energization system to the second energization system through the short-circuited path. As a result, the total phase current in the second energization system is restored to substantially zero, or a normal value.

Here, after a predetermined period has elapsed from when an abnormality in the first energization system is confirmed, followed by stopping first inverter 1A, second inverter 1B is stopped in response to the detection of an abnormality in the second energization system. Thus, in case of a short-circuit between the systems, it is determined at the end of the procedure whether the total phase current in the second energization system, which is no longer affected by the short-circuit, is normal.

Accordingly, even if the total phase current looks like abnormal in both the energization systems due to any short-circuit, it is possible to avoid stopping the inverters of both the energization systems and allow the inverter of one of the energization systems to continue to drive the motor.

By this control, electric power steering device 100 can continuously generate a steering assist force even in case of a short-circuit between the energization systems.

Regarding a period from when an abnormality is confirmed in the first energization system till an abnormality diagnosis on the second energization, the period is adjusted so that the switching elements in inverter 1A of the first energization system can be stabilized in OFF state, and the total phase current in the second energization system can be restored to substantially zero, or a normal value in case of a short-circuit between the systems.

To be specific, in case of a short-circuit between the two energization systems, even if the switching elements in first inverter 1A of the first energization system are turned OFF, the microcomputer makes an abnormality diagnosis on the second energization system before the total phase current in the second energization system can be restored to the normal value, unless enough time is ensured as a delay time till the abnormality diagnosis. This leads to the possibility of diagnosing both the energization systems as being abnormal and stopping the inverters thereof even though one of the energization systems can continue to drive the motor.

To avoid such situation, predetermined value C1 is set to ensure enough time after stopping the inverter of one of the energization systems in case of a short-circuit between the systems, so that the total phase current in the other energization system can be restored to the normal value.

Figure 7:
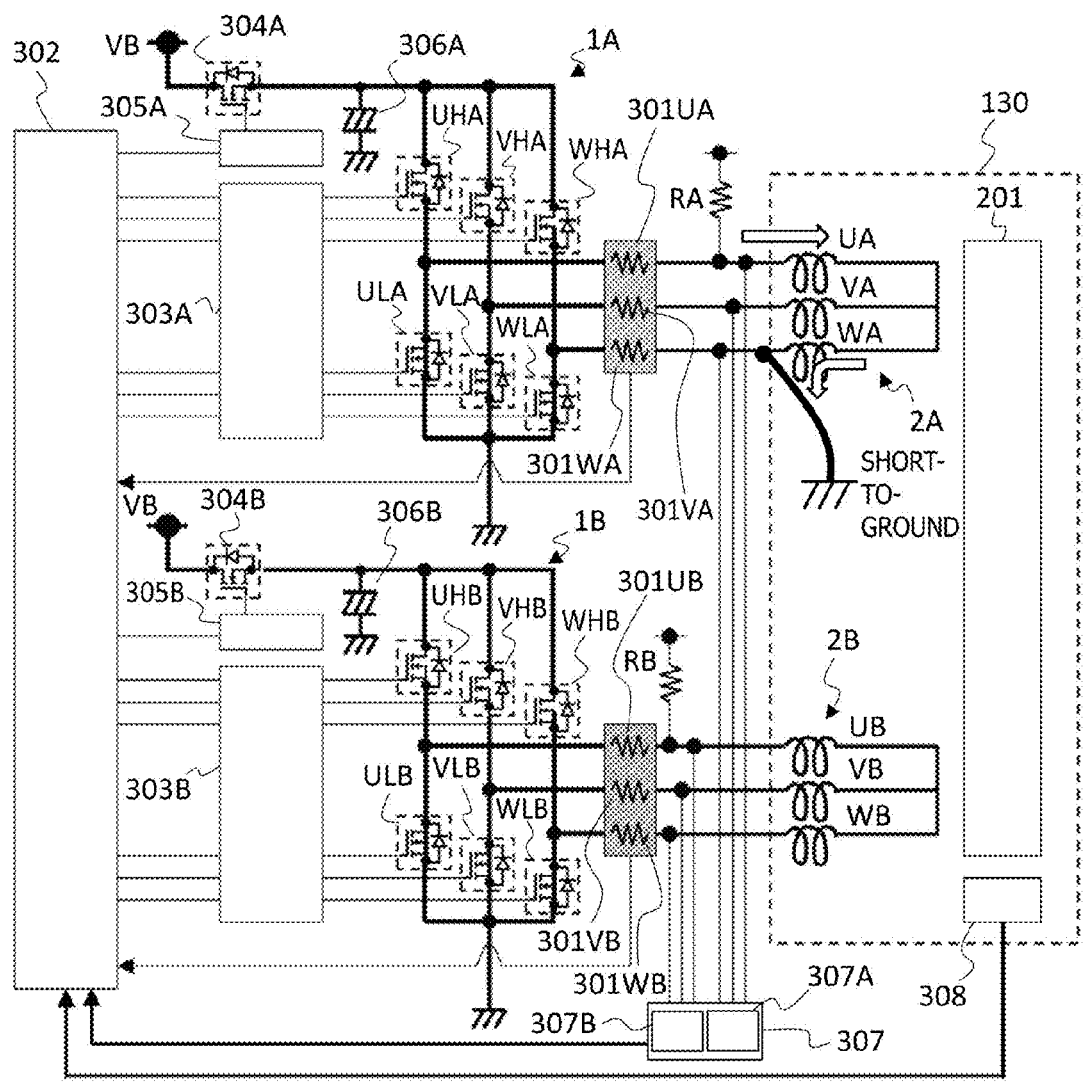
FIG. 7 is a circuit diagram illustrating the grounded first energization system according to the embodiment of the present invention.

FIG. 7 illustrates a fault mode that one of the first and second energization systems has an abnormality, and the other is normally operating. More specifically, in the illustrated example, a W-phase drive line of the first energization system is short-circuited to the ground point, and the second energization system has no fault such as a short-circuit.

Figure 8:
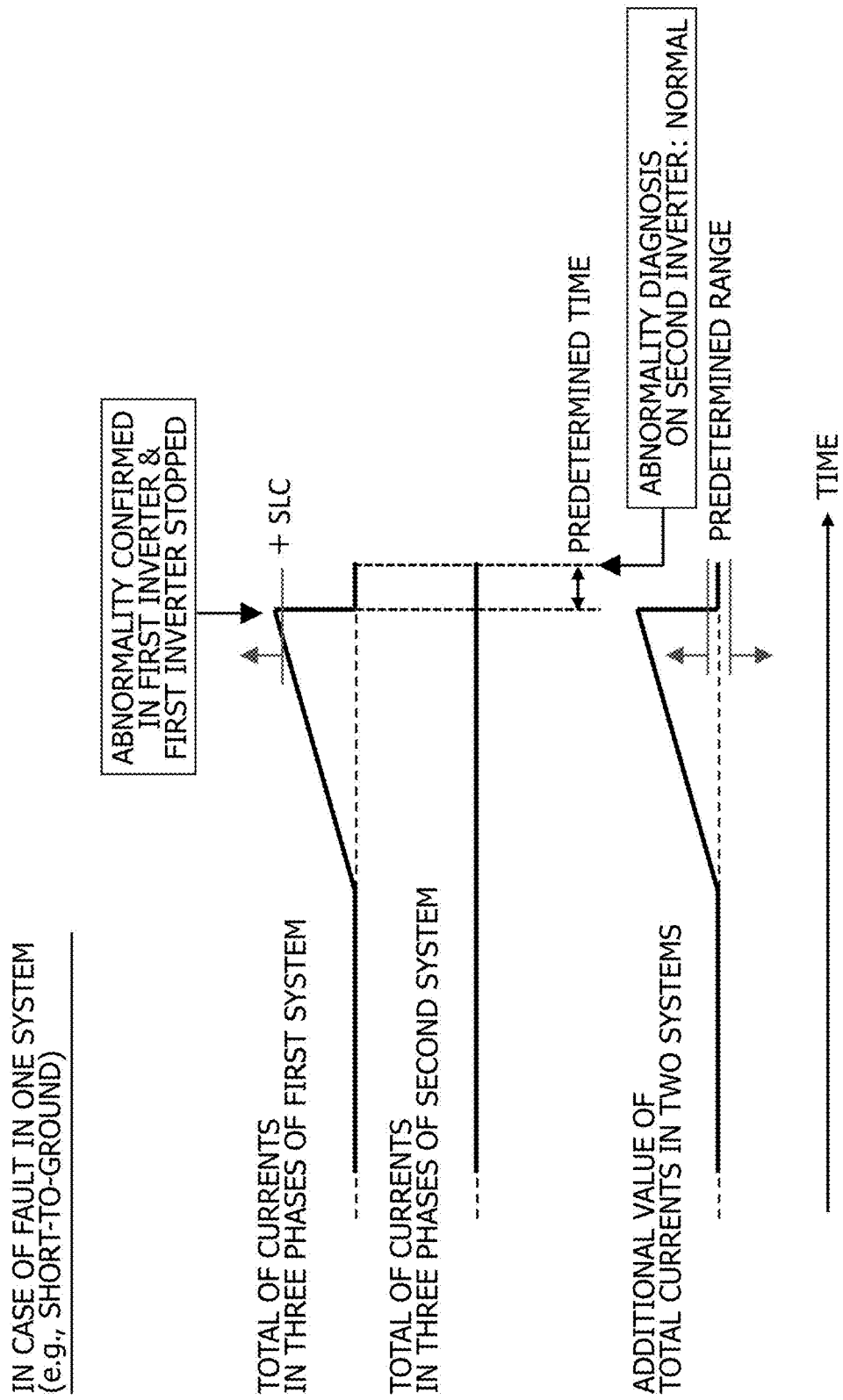
FIG. 8 is a timing chart illustrating current detection values obtained when the first energization system is grounded according to the embodiment of the present invention.

According to such fault mode, as illustrated in FIG. 7, a current passing through the W-phase of the first energization system leaks to the ground point before flowing into current sensor 301WA, as illustrated in FIG. 8, the total phase current deviates to the positive side from zero, whereas the total phase current in the second energization system is kept at around zero, or a normal value.

In the above fault mode, if the total phase current in the first energization system deviates to the positive side from zero, an abnormality in the first energization system is confirmed. However, even if the total phase current in the first energization system is abnormal, such abnormality does not affect the phase currents in the second energization system. Accordingly, after a predetermined period has elapsed from when the abnormality in the first energization system is confirmed, the phase currents in the second energization system become normal, whereby inverter 1B in the second energization system keeps operating.

To be specific, according to the processing illustrated in the flowchart of FIG. 4, if one of the two energization systems has an abnormality, whereas the other energization system is normally operating, the inverter of the failed energization system is stopped but the inverter of the normal energization system can keep operating and continue to drive the motor, hereby generating a steering assist force continuously.

Figure 9:
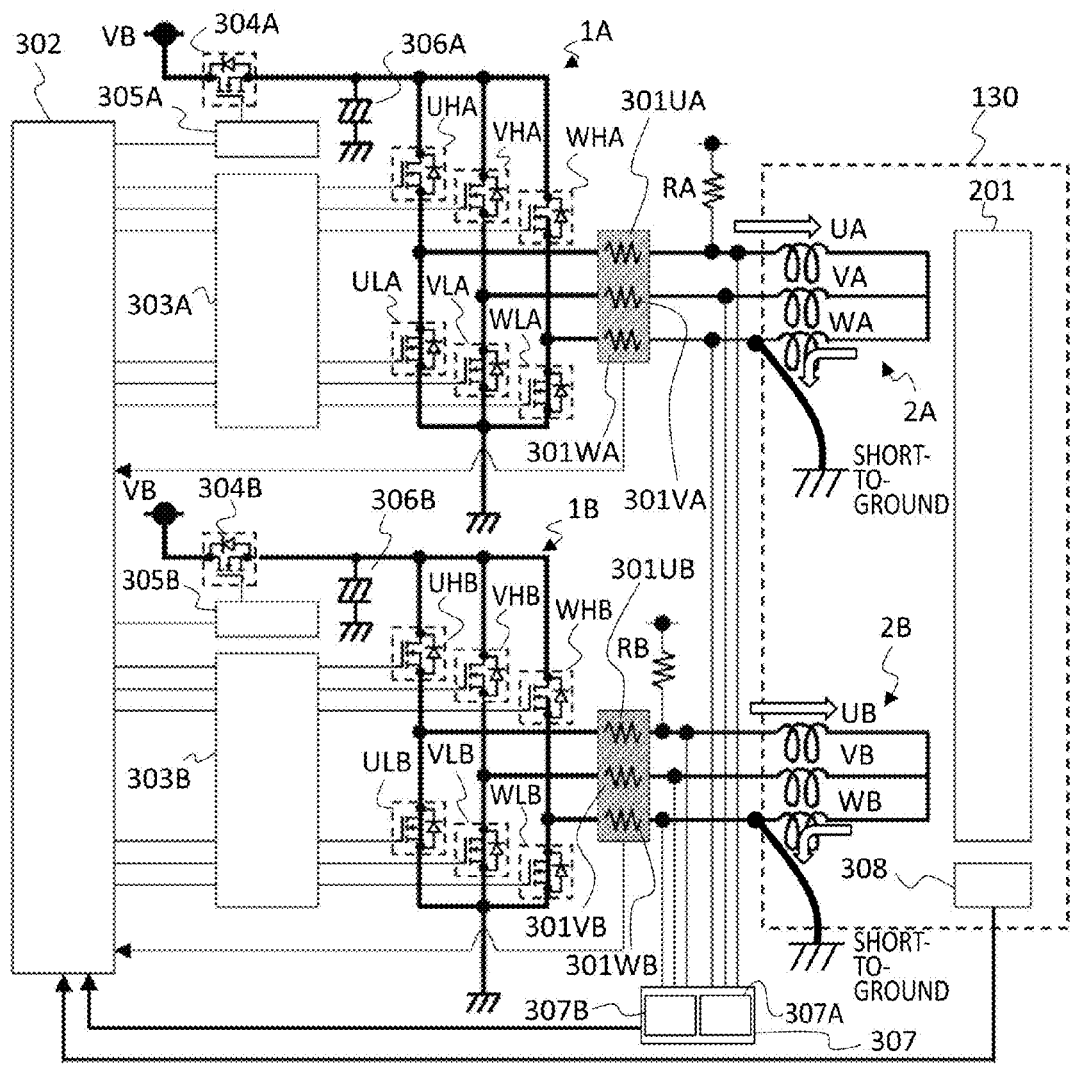
FIG. 9 is a circuit diagram illustrating the first energization system and the second energization system, both of which are grounded, according to the embodiment of the present invention.

FIG. 9 illustrates a fault mode that the first energization system and the second energization system both have an abnormality. To be specific, in the illustrated example, the W-phase drive line of the first energization system is short-circuited to the ground point and likewise, the W-phase drive line of the second energization system is short-circuited to the ground point.

Figure 10:
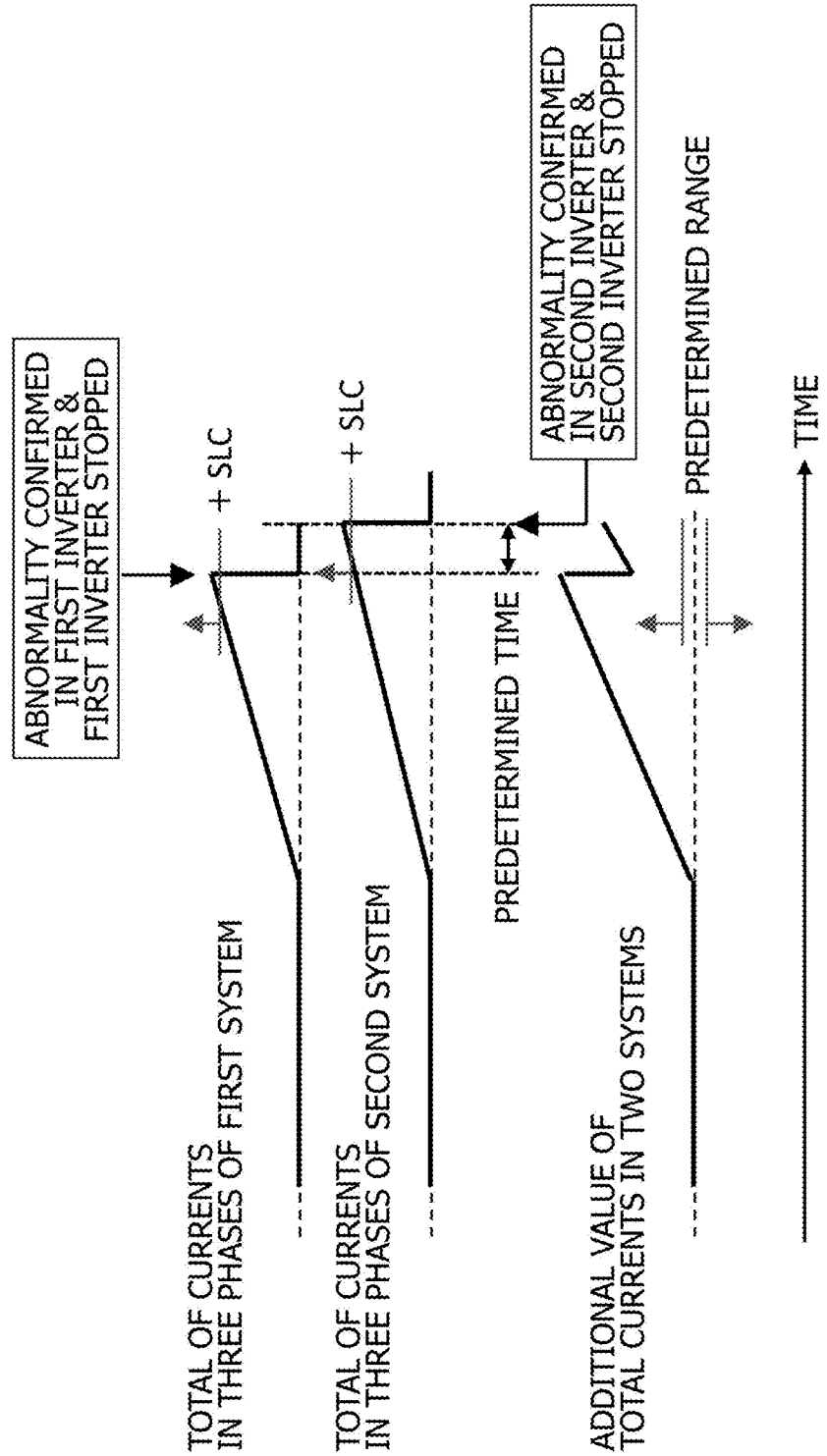
FIG. 10 is a timing chart illustrating current detection values obtained when the first energization system and the second energization system are both grounded according to the embodiment of the present invention.

In such fault mode, as illustrated in FIG. 9, current passing through the W-phase of the first energization system leaks to the ground point before flowing into current sensor 301WA. Thus, as illustrated in FIG. 10, the total phase current in the first energization system deviates to the positive side from zero. Likewise, current passing through the W-phase of the second energization system leaks to the ground point before flowing into current sensor 301WB. Thus, as illustrated in FIG. 10, the total phase current in the second energization system deviates to the positive side from zero.

In the above fault mode, if the total phase current in the first energization system deviates to the positive side from zero, an abnormality in the first energization system is first confirmed. In response to the confirmation of the abnormality in the first energization system, the inverter of the first energization system is stopped. As a result, the total phase current in the second energization system is not restored to a normal value. Then, after a predetermined period has elapsed from when the abnormality in the first energization system is confirmed, an abnormality in the second energization system is also confirmed, hereby stopping the inverters of the two energization systems. This makes it possible to stop the inverters of both the failed energization systems and prevent the failed systems from continuing to drive the motor.

If the two energization systems have different faults, as in the short-circuit between the two energization systems, the total phase current deviates from a normal value in both the energization systems. However, an abnormality in one energization system is first confirmed to stop the inverter thereof, after which an abnormality in the other energization system is confirmed based on the total phase current thereof. Thus, if the total phase current in the other energization system is still abnormal even after stopping the inverter of the one energization system, the two energization systems are concluded to have different faults. The different faults of the energization systems can be distinguished from a short-circuit between the energization systems.

In other words, even if the total phase current is abnormal in both the energization systems, in case of a short-circuit between the energization systems, the inverter of either one of the energization systems can keep operating and continue to drive the motor. Meanwhile, in case of different faults at the energization systems, the inverters of the two energization systems are stopped, hereby avoiding erroneous control on the motor.

FIGS. 6, 8, and 10 each illustrate an additional value of the total sum of current detection values in the three phases of the first energization system and the total sum of current detection values in three phases of the second energization system.

As illustrated in FIG. 6, in case of a short-circuit between the two energization systems, if the total phase current in one energization system deviates to the positive side, while the total phase current in the other energization system deviates to the negative side, the additional value approximates zero under the operations of the inverters in both the energization systems, because the deviation to the positive side in the one energization system cancels out the deviation to the negative side in the other energization system.

If the inverter of the one energization system is stopped, the total phase current in the one system equals zero. In addition, since no current flows into the other energization system through the short-circuited path, the total phase current in the other system is restored to zero. Hence, the additional value is held at substantially zero before and after the abnormality confirmation.

In other words, in case of a short-circuit between the two energization systems, although the total phase current becomes an outlier from zero at the respective energization systems, an additional value is held at substantially zero before and after stopping the inverter of one of the energization systems. In other words, when the total phase current becomes an outlier at both the energization systems, if an additional value of the total phase currents is substantially zero and is still kept at substantially zero even after stopping the inverter of one of the energization systems, the two energization systems can be diagnosed as being short-circuited.

On the other hand, as illustrated in FIG. 8, if one energization system has an abnormality, while the other energization system is normally operating, an additional value deviates from zero before stopping the inverter of the failed energization system. By stopping the inverter of the failed energization system, the additional value is restored to zero.

Here, it is assumed that, after stopping the inverter of one of the energization systems in response to the detection of an abnormality in the total phase current, a predetermined period has elapsed so that the abnormality detection counter is incremented up to predetermined value C1 and in such a state, the total phase current in the other energization system becomes normal. Under this condition, if the additional value is close to zero before the inverter of the one energization system is stopped, it is accordingly determined the two energization systems are short-circuited. Meanwhile, the additional value is not zero before the inverter of the one energization system is stopped, it is determined as above that only the one energization system has a fault.

Comparing the fault mode that a short-circuit occurs between the two energization systems as illustrated in FIG. 6 and the fault mode that the energization systems have different faults as illustrated in FIG. 10, the total phase current becomes an outlier at both the energization systems before stopping the inverter of the one energization system in response to the detection of an abnormality in the total phase current, in the respective fault modes.

In the fault mode that a short-circuit occurs between the two energization systems, the additional value of the total phase currents, which are both outliers, is close to zero. Meanwhile, in the fault mode that the energization systems have different faults, the additional value of the total phase currents, which are both outliers, might not be close to zero. Thus, if the additional value of the total phase currents, which are outliers, is close to zero, it is determined that the two energization systems are short-circuited.

Moreover, it is assumed that the total phase current becomes an outlier at both the energization systems before stopping the inverter of one of the energization systems in response to the detection of an abnormality in the total phase current. On this assumption, even when a predetermined period has elapsed after the inverter of the one energization system is stopped until the abnormality detection counter is incremented up to predetermined value C1, if the total phase current in the other energization system is still an outlier, it is determined that the two energization systems have different faults.

Hereinbefore, the present invention is described in detail on the basis of the preferred embodiments but it is obvious that one skilled in the art can make various modifications within the basic technical ideas and teachings of the present invention.

The controller for a motor according to the present invention is also applicable to an electric motor where three-phase coils U, V, and W are connected by means of delta connection as well as electric motor 130 having three-phase coils U, V, and W star-connected.

Figure 11:
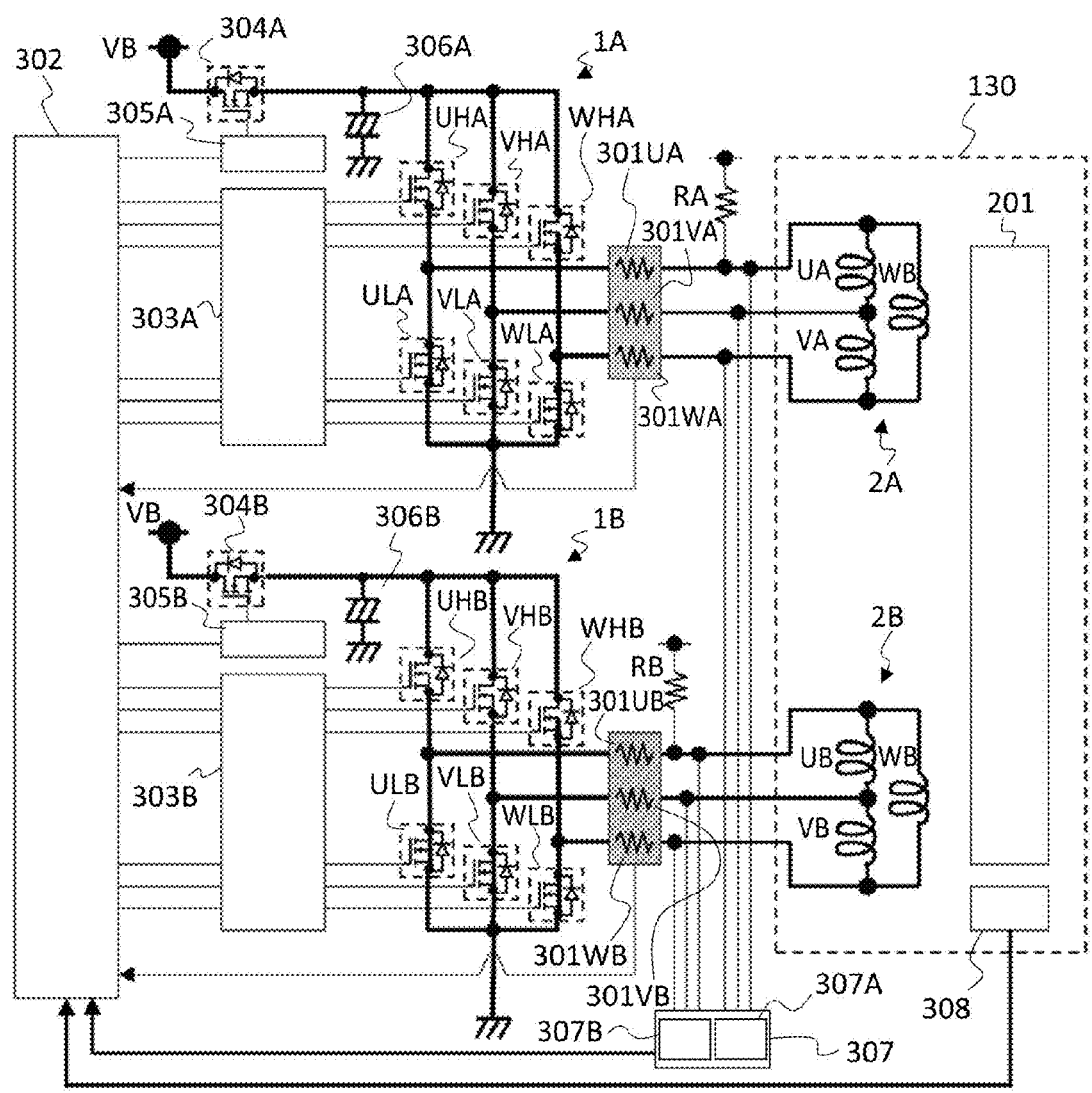
FIG. 11 is a circuit diagram of the motor that adopts delta-connected coil configuration according to the embodiment of the present invention.

FIG. 11 illustrates the layout of current sensors 301 in the electric motor having delta-connected three-phase coils U, V, and W. In the illustrated example of FIG. 11, current sensors 301U, 301V, and 301W are provided between output points of inverters 1A and 1B and connection points of delta-connected three-phase coils U, V, and W.

In addition, the controller for a motor according to the present invention is applicable to a device equipped with three or more coil sets composed of three-phase coils U, V, and W, and three or more inverters for driving the respective coil sets.

Furthermore, the controller of the present invention can be applied not only to the electric motor that generates a steering assist force in a vehicle electric power steering device but also to various motors such as a motor serving as an actuator for a variable valve mechanism of an engine and a motor used for driving a pump.

In addition, if any one of plural energization systems has a fault, a warning device such as a warning lamp or buzzer can be operated to inform a driver of the vehicle about an abnormality etc. in an electric power steering device incorporating the electric motor.

REFERENCE SYMBOL LIST

1A first inverter
1B second inverter
2A first coil set
2B second coil set
4 output voltage calculating unit
5 motor rotational speed calculating unit
6 target assist torque calculating unit
7A first output duty calculating unit
7B second output duty calculating unit
8A first two-to-three phase converting unit
8B second two-to-three phase converting unit
9A first dead time compensation unit
9B second dead time compensation unit
11 three-to-two phase converting unit
12 inverter output ON/OFF determination unit
13A first energization system ON/OFF control unit 13B second energization system ON/OFF control unit
130 electric motor
150 electronic control unit
301UA, 301VA, 301WA, 301UB, 301VB, 301WB current sensor
302 microcomputer
304A, 304B power supply relay
307 voltage monitor circuit
UHA, VHA, WHA, UHB, VHB, WHB high-potential side switching element
ULA, VLA, WLA, ULB, VLB, WLB low-potential side switching element

The invention claimed is:

1. A controller for a motor equipped with a plurality of energization systems each including a coil set of coils corresponding to a plurality of phases and an inverter for outputting a current to each of the phases in the coil set, the controller comprising:
a first control unit configured to determine whether an abnormality occurs in each of the energization systems and stop the inverter of the energization system having an abnormality detected; and
a second control unit configured such that, within a predetermined period from when the first control unit stops the inverter of one of the energization systems, even if an abnormality is detected in the inverter of another energization system, the second control unit continues to operate the inverter of the other energization system.

2. The controller for a motor according to claim 1, wherein the first control unit is configured to read detection values of currents flowing in the coils of the coil set, and determine that an abnormality occurs in the energization system including the coil set where the total current detection value deviates from a predetermined range.

3. The controller for a motor according to claim 2, further comprising a third control unit configured to read detection values of currents flowing in the coils of the coil set and receive a command to stop the inverter with the first control unit, and execute processing such that, if two or more of the energization systems have an abnormality that the total sum of currents in the respective phases deviates from a predetermined range, and the inverter of one of the energization systems having the abnormality is stopped, wherein the total sum of currents in the respective phases of the other energization system is restored to a normal value, it is determined that a short-circuit occurs between the energization systems having the abnormality.

4. The controller for a motor according to claim 2, further comprising a fourth control unit configured to read detection values of currents flowing in the coils of the coil set and execute processing such that, if two or more of the energization systems have an abnormality that the total sum of currents in the respective phases deviates from a predetermined range, and an additional value of the total sums of currents in the respective phases of the energization systems having the abnormality falls within a predetermined range, it is determined that a short-circuit occurs between the energization systems having the abnormality.

5. The controller for a motor according to claim 2, further comprising a fifth control unit configured to read detection values of currents flowing in the coils of the coil set and receive a command to stop the inverter with the first control unit, and execute processing such that, if two or more of the energization systems have an abnormality that the total sum of currents in the respective phases deviates from a predetermined range, and even when the inverter of one of the energization systems having the abnormality is stopped, the total sum of currents in the respective phases of the other energization system is not restored to a normal value, it is determined that the energization systems have different abnormalities.

6. The controller for a motor according to claim 1, wherein the second control unit is configured to invalidate detection of an abnormality in the other energization system with the first control unit within the predetermined period.

7. The controller for a motor according to claim 1, wherein the first control unit is configured to stop the inverter of the energization system having an abnormality detected after the predetermined period.

8. The controller for a motor according to claim 1, wherein the predetermined period referenced by the second control unit is based on a period from when the inverter is stopped until currents in the respective phases are stabilized.

9. The controller for a motor according to claim 1, wherein the first control unit is configured to read detection values of currents flowing in the coils of the coil set and determine whether an abnormality occurs, depending on the read detection values of currents.

10. The controller for a motor according to claim 9, further comprising a current sensor for detecting currents in the respective phases, which is disposed at each output of the inverter.

11. The controller for a motor according to claim 1, wherein the first control unit is configured to stop the inverter of the energization system having an abnormality detected and keep ON a power supply relay disposed between the stopped inverter and a power source.

12. The controller for a motor according to claim 1, wherein a first energization system and a second energization system are provided as the plurality of energization systems, and the first control unit is configured to determine whether an abnormality occurs in the second energization system when the first energization system is normally operating and determine whether an abnormality occurs in the second energization system after the predetermined period has elapsed from when the inverter of the first energization system is stopped.

13. The controller for a motor according to claim 1, wherein the first control unit is configured to read detection values of currents flowing in the coils of the coil set at each energization system, and determine that an abnormality occurs in the energization system where an absolute value of the total sum of currents in the respective phases remains higher than a predetermined value (predetermined value>0) for a predetermined time.

14. The controller for a motor according to claim 1, wherein a first energization system and a second energization system are provided as the plurality of energization systems, and the controller further comprises a sixth control unit that is configured to receive a command to stop the inverter with the first control unit and a command to continue to operate the inverter with the second control unit, and execute processing such that, when the inverter of one of the first energization system and the second energization system is stopped and the inverter of the other energization system keeps operating, a target motor torque for the other energization system is increased compared to a torque set before the inverter of the one energization system is stopped.

15. A control method for a motor equipped with a plurality of energization systems each including a coil set of coils corresponding to a plurality of phases and an inverter for outputting a current to each of the phases in the coil set, the method comprising the steps of:

determining whether an abnormality occurs in each of the energization systems;
stopping the inverter of the energization system having an abnormality detected; and
continuing, even if an abnormality is detected in the inverter of another energization system within a predetermined period from when the inverter is stopped, to operate the inverter of the other energization system.

* * * * *